United States Patent Office 3,394,192
Patented July 23, 1968

3,394,192
PREPARATION OF β-MERCAPTOALKANOLS
Howard E. Jones, Wilmington, Del., assignor to E. I. du Pont de Nemours and Company, Wilmington, Del., a corporation of Delaware
No Drawing. Filed Mar. 16, 1966, Ser. No. 534,674
10 Claims. (Cl. 260—609)

This invention relates to processes for the preparation of β-mercaptoalkanols. More particularly, this invention is directed to improved processes for preparing β-mercaptoalkanols from hydrogen sulfide and 1,2-epoxides.

It is known in the art to prepare the β-mercaptoalkanol, 2-mercaptoethanol, from the reaction at atmospheric pressure between hydrogen sulfide and ethylene oxide in the presence of a catalyst or solvent such as water, lower alcohols, porus clay, and alumina. This process has obtained yields on the order of 50 to 60%, based on ethylene oxide. This low yield is believed to be due to the formation of thiodiethanol during the reaction, i.e. the 2-mercaptoethanol initially produced further reacts with the unreacted ethylene oxide to form thiodiethanol.

Various methods have been suggested to improve the process by reducing the formation of thiodiethanol during the reaction. Thus the use of a large excess of hydrogen sulfide in the presence of a catalytic amount of thiodiethanol or 2-mercaptoethanol has been attempted. Another method involves initially interacting the hydrogen sulfide with sodium hydroxide to form hydrosulfide, which is then reacted with ethylene oxide. However, these processes are not completely satisfactory, in that additional neutralization steps are required or recovery and waste disposal steps must be provided.

According to the present invention, there is provided an improved process for preparing β-mercaptoalkanols in surprisingly good yield, which comprises reacting a small excess over the stoichiometric requirement of hydrogen sulfide with a 1,2-epoxide compound of the following general formula:

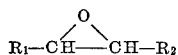

wherein:

$R_1$ is selected from the group consisting of hydrogen, alkyl of 1 to 16 carbon atoms, alkoxyalkyl of 2 to 16 carbon atoms, phenyl, carbomethoxy, carboethoxy, hydroxyalkyl of 1 to 5 carbon atoms and chloroalkyl of 1 to 5 carbon atoms;

$R_2$ is selected from the group consisting of hydrogen or alkyl of 1 to 4 carbon atoms, provided that $R_1$ and $R_2$ can be taken together and are cycloalkyls of 3 to 12 carbon atoms;

in the presence of a trialkylamine with a basic ionization constant, $K_b$, between $10^{-3}$ and $10^{-7}$, at temperatures between 0°–150° C., optionally, in the presence of a solvent, and separating from the reaction mass a β-mercaptoalkanol of the following formula:

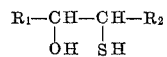

wherein $R_1$ and $R_2$ are the same as above.

The process of the invention can be performed at superatmospheric or atmospheric pressures. In the superatmospheric pressure embodiment it is preferred that sufficient pressure is provided to maintain the system in the liquid state.

STARTING MATERIALS

Hydrogen sulfide is commercially available, and its preparation is well known in the art. Commercial grade hydrogen sulfide can be used in the process of the invention.

The 1,2-epoxides which can be used as a reactant are of the following formula:

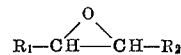

wherein:

$R_1$ can be hydrogen, alkyl of 1 to 16 carbon atoms, alkoxyalkyl of 2 to 16 carbon atoms, phenyl, carbomethoxy, carboethoxy, hydroxyalkyl of 1 to 5 carbon atoms, and chloroalkyl of 1 to 5 carbon atoms; and $R_2$ can be either hydrogen or alkyl of 1 to 4 carbon atoms; also $R_1$ and $R_2$ can be joined or taken together to form a cycloalkyl of 3 to 12 carbon atoms, e.g. cyclohexene oxide.

The preferred 1,2-epoxide, ethylene oxide, is commercially available or it can be prepared by methods well known in the art, e.g. the catalytic oxidation of ethylene by air.

The other 1,2-epoxides are commercially available or can be prepared by well-known methods, e.g. by the action of an alkali on a bromohydrin or chlorohydrin.

The 1,2-epoxides useful in the process of the invention are exemplified by the following:

propylene oxide
styrene oxide
cyclohexene oxide
3-chloro-1,2-propyleneoxide
cyclopentene oxide
3-hydroxy-1,2-propyleneoxide
methylacrylate oxide
ethylacryate oxide
3-methoxy-1,2-propyleneoxide
dodecenyloxide
methylcrotonate oxide
hept-3-eneoxide The improved yield of the process of the invention is created by the presence of the trialkylamine in either the atmospheric or superatmospheric embodiment. Some of the trialkylamines useful in the process of the invention are triethylamine, trimethylamine, tri-n-propylamine, tri-n-butylamine and mixtures thereof.

The trialkylamines having a basic ionization constant, $K_b$, between $10^{-3}$ and $10^{-7}$ are the most useful and of these, triethylamine and trimethylamine are preferred.

Optionally, but preferably, an inert solvent can also be used in the subject process. The particular solvent used and its concentration are not critical. All that is necessary is that it be a solvent for the active ingredients, that it not be reactive during the course of the reaction and that it be liquid at the reaction temperature. Another factor which should be considered in the choice of a solvent is its boiling point; since the β-mercaptoalkanol prepared must be separated from the reaction mass in a still, the boiling point of the solvent should be distinct from that of the β-mercaptoalkanol desired.

In the atmospheric pressure process the lower alcohols, which include methanol, ethanol, propanol, butanol, etc. are particularly useful as solvents. Other solvents that can be used are water, 2-mercaptoethanol, thiodiethanol, dimethylformamide, dimethyl sulfoxide, or mixtures thereof. In the superatmospheric pressure procedure, an inert hydrocarbon solvent, e.g. toluene, mixed with a small amount of water is particularly useful.

REACTION CONDITIONS

In the process of this invention, the hydrogen sulfide and the 1,2-epoxide are usually brought together in a solvent media in a reaction vessel.

United States Patent Office 3,394,193
Patented July 23, 1968

3,394,193
PRODUCTION OF HYDROQUINONES
Walter Reppe, Heidelberg, and August Magin, Mutterstadt, Pfalz, Germany, assignors to Badische Anilin- & Soda-Fabrik Aktiengesellschaft, Ludwigshafen (Rhine), Germany
No Drawing. Filed Mar. 4, 1966, Ser. No. 531,757
Claims priority, application Germany, Mar. 5, 1965,
B 80,829
9 Claims. (Cl. 260—621)

ABSTRACT OF THE DISCLOSURE

A process for producing hydroquinones having the formula

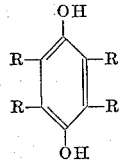

wherein R denotes hydrogen, alkyl of 1 to 10 carbon atoms, phenyl, chloro-substituted phenyl, and methoxy-substituted phenyl in which at least one acetylene compound having the formula

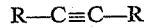

R—C≡C—R is reacted with carbon monoxide and water in the presence of iron carbonyls at 50° to 220° C. and a pressure of more than 100 atmospheres, the water being added at the rate at which it is used up. Hydroquinones are suitable for stabilizing monomers (cf. Houben-Weyl, Methoden der Organischen Chemie 14/1 (1961) 42).

This invention relates to a new process for the production of hydroquinones from acetylene compounds, carbon monoxide and water in the presence of a metal carbonyl compound.

It is known from German patent specification No. 870,698 that hydroquinones can be prepared by the action of iron carbonyl or cobalt carbonyl and water or an organic compound containing a hydroxyl group on acetylene or its substitution products in the presence of basic substances at elevated temperature and at superatmospheric pressure in an inert solvent. Metal carbonyl hydrides form in the reaction mixture from the metal carbonyls and the basic substances and it is therefore possible to use metal carbonyl hydrides direct as starting materials. The metal carbonyls or the metal carbonyl hydrides are used in stoichiometric amounts. The yields of hydroquinone, with reference to iron pentacarbonyl, are up to 22% of the theory, and the yields with reference to acetylene are up to 31% of the theory.

According to U.S. patent specification No. 2,702,304 it is possible to replace the metal carbonyl or metal carbonyl hydride partly by carbon monoxide if complex salts of metal carbonyl hydrides are present. The yields in this method are 35.4 to 51.8% of the theory with reference to acetylene.

According to U.S. patent specification No. 3,055,949, hydroquinones are prepared from acetylene compounds, carbon monoxide and water in the presence of ruthenium or rhodium compounds as catalysts. Apart from the fact that ruthenium and rhodium compounds are very expensive catalysts, the yields in this process are only 4 to 33% of the theory with reference to the acetylene compounds.

We have now found that hydroquinones having the general Formula I:

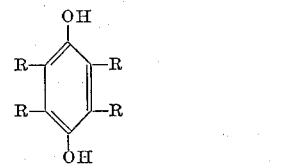

in which the substituents R may be identical or different and denote hydrogen atoms, alkyl groups having one to ten carbon atoms, araliphatic radicals having seven to ten carbon atoms or aromatic radicals having six to eight carbon atoms, are advantageously obtained by reacting an acetylene compound having the Formula II:

R—C≡C—R          (II)

in which the substituents R have the above meanings with carbon monoxide and water in the presence of a metal carbonyl compound at elevated temperature and under superatmospheric pressure in an inert solvent and by using an iron carbonyl as the metal carbonyl and supplying the water at the rate at which it is used up.

The new process gives better yields of hydroquinones than the methods referred to above. Contrasted with the stoichiometric method according to German patent specification No. 870,698, the new process may be regarded as stoichiometric-catalytic because considerable amounts of the carbon monoxide required are covered from the carbon monoxide gas and not from the iron carbonyl serving simultaneously as catalyst. As compared with the method described in U.S. patent specification No. 2,702,304 the new process has the advantage that the catalyst and carbon monoxide donor is an inexpensive iron carbonyl. The carbonyl

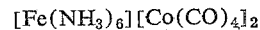

[Fe(NH₃)₆][Co(CO)₄]₂ is recommended in U.S. patent specification No. 2,702,-304 as a particularly suitable catalyst. This catalyst is expensive, complicated and can only be prepared in poor yields from its components. During the synthesis it is degraded to organic salts (for example iron acrylate, cobalt acrylate and polyacrylates) and its recovery therefrom is so expensive that it is more advantageous to prepare fresh catalyst in each case. The new process has the advantage over the prior art methods that considerably better yields of hydroquinones are obtained without expensive or difficultly accessible substances, such as ruthenium compounds, rhodium compounds or complex salts of metal carbonyl hydrides.

If acetylene be reacted according to the new process, unsubstituted hydroquinone is obtained. It is however possible to start from acetylene which is substituted once or twice. Preferred compounds (besides acetylene) are quired to keep the temperature below 50° C. Stirring and sparging are continued for 15 minutes.

Low boiling components are removed by distillation at atmospheric pressure and the residue is distilled under reduced pressure. This procedure gives 312 g. (85% yield) of 2-hydroxypropylmercaptan boiling at 58–60° C./15 mm.

The process of the invention has many advantages and the primary one being that with the use of conventional reaction vessels and inexpensive raw materials, a high yield of β-mercaptoalkanols can be produced.

I claim:

1. In the process of preparing β-mercaptoalkanols by reacting hydrogen sulfide with a 1,2-epoxide compound of the following formula:

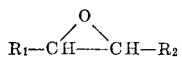

wherein:

$R_1$ is selected from the group consisting of hydrogen, alkyl of 1 to 16 carbon atoms, alkoxyalkyl of 2 to 16 carbon atoms, phenyl, carbomethoxy, carboethoxy, hydroxyalkyl of 1 to 5 carbon atoms and chloroalkyl of 1 to 5 carbon atoms; and $R_2$ is selected from the group consisting of hydrogen, and alkyl of 1 to 4 carbon atoms, provided that $R_1$ and $R_2$ can be joined and are cycloalkyls of 3 through 12 carbon atoms;

and separating from the reaction mass said β-mercaptoalkanols, the improvement of conducting said reaction in the presence of a trialkylamine with a basic ionization constant, $K_b$, between $10^{-3}$ and $10^{-7}$.

2. The process of claim 1 wherein the reaction takes place in the presence of an inert solvent at temperatures from 0° to 150° C.

3. A process as set forth in claim 1 wherein the trialkylamine is triethylamine.

4. A process as set forth in claim 1 wherein the trialkylamine is trimethylamine.

5. A process for preparing 2-mercaptoethanol comprising reacting under pressure a small excess over the stoichiometric requirement of hydrogen sulfide with ethylene oxide in the presence of a trialkylamine with a basic ionization constant, $K_b$, between $10^{-3}$ and $10^{-7}$, and an inert hydrocarbon solvent, at temperatures between 60° and 125° C., and separating said 2-mercaptoethanol from the reaction mass.

6. A process as set forth in claim 5 wherein the trialkylamine is triethylamine.

7. A process as set forth in claim 5 wherein the trialkylamine is triethylmethylamine.

8. A process for preparing 2-mercaptoethanol comprising reacting at atmospheric pressure a small excess over the stoichiometric requirement of hydrogen sulfide with ethylene oxide in the presence of a trialkylamine with a basic ionization constant, $K_b$, between $10^{-3}$ and $10^{-7}$ and a lower alcohol, at temperatures from 25° to 50° C., and separating said 2-mercaptoethanol from the reaction mass.

9. A process as set forth in claim 8 wherein the trialkylamine is triethylamine.

10. A process as set forth in claim 8 wherein the trialkylamine is trimethylamine.

References Cited

UNITED STATES PATENTS 3,086,997   4/1963   Warner _____ 260—609

FOREIGN PATENTS 585,655   2/1947   Great Britain.
769,216   6/1934   France.

CHARLES B. PARKER, *Primary Examiner.*

D. R. PHILLIPS, *Assistant Examiner.* with about 400 ml. of dioxane at 80° C., the filtrate being worked up separately. The dioxane used for extraction is distilled off at subatmospheric pressure and 48.7 g. of hydroquinone having a melting point of 168° C. is obtained as a residue.

The dioxane is substantially distilled off at subatmospheric pressure from the filtrate, obtained by suction filtration of the sample of reaction mixture and including the wash liquid, and first the iron pentacarbonyl present passes over mixed with dioxane and then pure dioxane. The remaining dioxane is distilled off at about 20 mm. Hg at a rising oil bath temperature up to about 130° C. Finally the distillation residue, which solidifies to a mass of crystals, is sublimed at a rising temperature up to about 220° C. 119 g. of crystals are obtained which are washed with about 500 ml. of toluene at 50° C. and thereafter dried. 93.4 g. of practically pure hydroquinone remains having a melting point of 170° to 171° C. The total yield from the sample is thus 142.1 g. of hydroquinone, equivalent to a yield of 1722 g. from the whole reaction product. This is equivalent to 69% of the theory with reference to acetylene used.

When following the same procedure but adding 520 g. of water at the beginning instead of in a plurality of batches, the yield of hydroquinone is only 50% of the theory with reference to acetylene reacted.

Example 2

250 g. of acetonitrile, 12.8 g. of iron pentacarbonyl and 2.6 g. of water are reacted as described in Example 1 in a 0.8-liter rotating autoclave of alloy steel with a gas mixture of 11% by volume of acetylene and 89% by volume of carbon monoxide at 160° to 165° C. and 700 atmospheres for ten hours. The pressure is released, another 2.6 g. of water is added, and the reaction mixture is again reacted with acetylene-carbon monoxide gas mixture as before. The total pressure drop is 30 atmospheres. 18 g. of hydroquinone is obtained by working up the reaction mixture as described in Example 1. The product is purified by recrystallization from water. The yield is about 53% of the theory with reference to reacted acetylene.

Example 3

230 g. of freshly distilled diethyl ether, 12.8 g. of iron pentacarbonyl and 2.6 g. of water are reacted in a 0.8-liter rotating autoclave of alloy steel in the way described in Example 1 with a gas mixture of 11% by volume of acetylene and 89% by volume of carbon monoxide at 140° to 145° C. and 700 to 740 atmospheres for ten hours. The pressure is released, another 2.6 g. of water is added, and treatment with the gas mixture of acetylene and carbon monoxide is continued as above. The solvent and iron pentacarbonyl are distilled off from the reaction mixture, the remaining solid residue is extracted with ether and the ether is evaporated from the filtrate. Crude hydroquinone is obtained which is purified by sublimation. 6.3 g. of hydroquinone is obtained having a melting point of 164° C. The yield is about 45% of the theory with reference to acetylene.

Example 4

363 g. of butyrolactone, 1.28 g. of iron pentacarbonyl and 2.6 g. of water is treated as in Example 1 in a 0.8-liter rotating autoclave of alloy steel with a gas mixture of 11% by volume of acetylene and 89% by volume of carbon monoxide at 160° to 165° C. and 680 to 700 atmospheres for ten hours. The pressure is released, another 2.6 g. of water is added, and treatment with the gas mixture of acetylene and carbon monoxide is continued as above. The solid constituents are filtered off from the reaction mixture and washed with hot acetone. The filtrate and wash liquid are combined, and the acetone is distilled off at atmospheric pressure and the butyrolactone at 10 mm. Hg. The residue is mainly crystalline; crude hydroquinone is obtained therefrom by sublimation in vacuo and is purified with toluene. 11 g. of pure product having a melting point of 168° C. is obtained. The yield is 44% of the theory with reference to acetylene.

Example 5

200 g. of acetone, 20 g. of iron pentacarbonyl, 6.1 g. of anhydrous calcium chloride and 6.1 g. of water are charged into a rotating autoclave of 0.8-liter capacity as described in Example 1 after it has been swept with nitrogen, while excluding air. The mixture is saturated at 60° C. with acetylene at 12 atmospheres and then carbon monoxide is forced in until the total pressure is 440 atmospheres. The reaction mixture is heated to 160° C. to 165° C. within three hours, the pressure rising to 630 atmospheres. Then carbon monoxide is pumped in until the pressure is 700 atmospheres and the pressure is kept at 680 to 700 atmospheres for ten hours by pumping in more gas mixture. The reaction mixture is worked up as described in Example 1. 16.0 g. of hydroquinone having a melting point of 170° to 171° C. is obtained. The yield of hydroquinone is 70% of the theory with reference to acetylene.

By following the same procedure but without using calcium chloride, the yield of hydroquinone is only 49% of the theory.

Example 6

320 g. of dioxane, 12.8 g. of iron pentacarbonyl, 3.0 g. of anhydrous sodium sulfate and 3.0 g. of water is reacted as in Example 1 in a 0.8-liter rotating autoclave of alloy steel with a gas mixture of 11% by volume of acetylene and 89% by volume of carbon monoxide for ten hours at 160° to 165° C. and 680 to 700 atmospheres. The solid constituents are suction filtered and washed with hot acetone. The filtrate and wash liquid are combined, the acetone is distilled off at atmospheric pressure and the dioxane is distilled off at about 120 mm. Hg. Crude hydroquinone is obtained from the crystalline residue by sublimation in vacuo and is then washed with toluene. 16.7 g. of pure product is obtained having a melting point of 168° to 170° C. The yield is 60% of the theory with reference to acetylene.

Practically the same result is obtained by using 5 g. of anhydrous silica gel instead of anhydrous sodium sulfate.

Example 7

320 g. of dioxane, 12.8 g. of iron pentacarbonyl, 15.1 g. of anhydrous barium chloride and 3.0 g. of water is reacted as described in Example 1 in a 0.8-liter rotating autoclave of alloy steel with a mixture of 11% by volume of acetylene and 89% by volume of carbon monoxide for ten hours at 160° to 165° C. and 690 to 700 atmospheres. The solid constituents are suction filtered from the reaction mixture and washed with hot acetone. The filtrate and wash liquid are combined and the acetone is distilled off at atmospheric pressure and the dioxane at 120 mm. Hg. Crude hydroquinone is obtained from the crystalline residue by sublimation in vacuo and then freed from a little adherent oily matter with toluene. 15.3 g. of pure product having a melting point of 168° to 169° C. is obtained. The yield is 66% of the theory with reference to acetylene.

Example 8

250 g. of dioxane, 13.5 g. of anhydrous strontium chloride, 6.1 g. of water and 20 g. of iron pentacarbonyl are charged into a rotating autoclave of alloy steel having a capacity of 0.8 liter while excluding air and after it has been swept with nitrogen. The mixture is saturated at 60° C. with acetylene at 12 atmospheres and then carbon monoxide is forced in until a total pressure of 440 atmospheres is reached. The reaction mixture is heated in the course of three hours to 160° to 165° C., the pressure rising to 570 atmospheres. Carbon monoxide is then forced in until a pressure of 700 atmospheres is reached and the pressure is maintained at 690 to 700 atmospheres